(12) United States Patent
Zhan

(10) Patent No.: US 9,723,574 B2
(45) Date of Patent: Aug. 1, 2017

(54) IMBALANCED AREA PILOT FREQUENCY TRANSMISSION POWER ENHANCEMENT METHOD AND BASE STATION

(71) Applicant: ZTE CORPORATION, Guangdong (CN)

(72) Inventor: Jianming Zhan, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/105,922

(22) PCT Filed: May 28, 2014

(86) PCT No.: PCT/CN2014/078688
§ 371 (c)(1),
(2) Date: Jun. 17, 2016

(87) PCT Pub. No.: WO2014/187381
PCT Pub. Date: Nov. 27, 2014

(65) Prior Publication Data
US 2017/0006558 A1    Jan. 5, 2017

(30) Foreign Application Priority Data
Dec. 17, 2013    (CN) .......................... 2013 1 0695868

(51) Int. Cl.
*H04W 52/32*    (2009.01)
*H04W 52/14*    (2009.01)
*H04W 52/16*    (2009.01)
*H04W 84/04*    (2009.01)

(52) U.S. Cl.
CPC ....... *H04W 52/325* (2013.01); *H04W 52/143* (2013.01); *H04W 52/16* (2013.01); *H04W 84/045* (2013.01)

(58) Field of Classification Search
CPC ................. H04W 52/04–52/60; H04W 84/045
USPC .......................................... 455/522; 370/318
See application file for complete search history.

(56) References Cited

FOREIGN PATENT DOCUMENTS

| CN | 1559112 A | 12/2004 |
|---|---|---|
| CN | 1874585 A | 12/2006 |
| WO | 2011/116513 A1 | 9/2011 |

*Primary Examiner* — Raymond Dean
(74) *Attorney, Agent, or Firm* — Scully Scott Murphy & Presser

(57) ABSTRACT

An imbalanced area pilot frequency transmission power enhancement method and a base station are provided. In accordance with the transmission power and increment of a main public pilot frequency channel prior to power enhancement, post-power enhancement main public pilot frequency channel transmission power is obtained. The transmission power of a downlink traffic channel is the same as transmission power prior to power enhancement. In accordance with the transmission power of the main public pilot frequency channel prior to power enhancement, the downlink traffic channel transmission power is also obtained. The post-power enhancement main public pilot frequency channel transmission power and the downlink traffic channel transmission power are used to transmit data in the main public pilot frequency channel and the downlink traffic channel, respectively.

15 Claims, 6 Drawing Sheets

IMBALANCED AREA PILOT FREQUENCY TRANSMISSION POWER ENHANCEMENT METHOD AND BASE STATION

CROSS-REFERENCE TO RELATED APPLICATION

This application is the 371 application of PCT Application No. PCT/CN2014/078688, filed May 28, 2014, which is based upon and claims priority to Chinese Patent Application No. 201310695868.3, filed Dec. 17, 2013, the entire contents of which are incorporated herein by reference.

TECHNICAL FIELD

The present disclosure relates to a pilot frequency (pilot) transmission technology, and more particularly, to a method for enhancing transmission power of a pilot frequency in an imbalance area, and a base station.

BACKGROUND

During implementations of technical solutions in embodiments of the present application, at least the following technical problems are found to exist in the related art.

In a network deployment of an actual Universal Mobile Telecommunications System (UMTS), a low-power base station (such as Micro, and Pico base stations) functions as a supplement of a macro base station. The low-power base station is deployed in a macro cell for supplementarily covering a hotspot, so as to form a heterogeneous network (Hetnet) scene in which the macro cell and the low-power cell coexist. In such scene, an imbalance problem of uplink and downlink of the user would occur, which results in a series of degradations of the user performance, such as a limitation of uplink coverage of some cells, a reduction of uplink macro diversity gain, even no uplink macro diversity gain, or even a dropped call of the user, a very low uplink and downlink data traffic flow, or a failed handover, and an interference to service experience of the user in the uplink and downlink imbalance area. With respect to the problem of imbalance of the uplink and downlink, there is no effective solution in the related art.

SUMMARY

Accordingly, the embodiments of the present disclosure are expected to provide a method for enhancing transmission power of a pilot frequency, and a base station. By enhancing the pilot frequency, the interference to the user in the imbalance area in the UMTS Hetnet network deployment can be solved, thereby avoiding the reduction of the user performance due to the imbalance of the uplink and downlink.

The technical solutions of the present disclosure are implemented as follows.

A method for enhancing transmission power of a pilot frequency includes:

acquiring transmission power of an enhanced primary common pilot channel according to transmission power of a non-enhanced primary common pilot channel and an increment;

setting transmission power of a downlink service channel to be the same as the transmission power of the non-enhanced primary common pilot channel, and acquiring the transmission power of the downlink service channel according to the transmission power of the non-enhanced primary common pilot channel; and using the transmission power of the enhanced primary common pilot channel and the transmission power of the downlink service channel to transmit data in the enhanced primary common pilot channel and the downlink service channel, respectively.

Preferably, the acquiring the transmission power of the enhanced primary common pilot channel according to the transmission power of the non-enhanced primary common pilot channel and the increment is implemented according to:

$P_{p\text{-}cpich} = P_{vitrual\_p\_cpich} + \text{Delta}$; wherein $P_{p\text{-}cpich}$ is the transmission power of the enhanced primary common pilot channel, $P_{vitrual\_p\_cpich}$ is the transmission power of the non-enhanced primary common pilot channel, and Delta is the increment.

Preferably, the acquiring the transmission power of the downlink service channel according to the transmission power of the non-enhanced primary common pilot channel is implemented according to:

$P_{HSPDSCH} = P_{vitrual\_p\_cpich} + \Gamma$; wherein $P_{HSPDSCH}$ is the transmission power of the downlink service channel, $P_{vitrual\_p\_cpich}$ is the transmission power of the non-enhanced primary common pilot channel, and $\Gamma$ is obtained by a signaling configuration of a base station application part protocol NBAP via a wireless network controller RNC.

Preferably, the method further includes:

acquiring transmission power of a downlink physical channel in a low-power base station cell and transmission power of a downlink dedicated control physical channel for transmitting data to a user in a soft handover area according to the transmission power of the enhanced primary common pilot channel;

wherein the downlink physical channel in the cell of the low-power base station, and the downlink dedicated control physical channel for transmitting data to the user in the soft handover area includes any of the following physical channels:

a primary common control physical channel, a primary synchronization channel, a secondary synchronization channel, an enhanced uplink hybrid automatic repeat request Indicator Channel, a dedicated physical control channel, a fractional dedicated physical channel, and an enhanced uplink relative grant channel; and all the other channels among the downlink physical channel in the cell of the low-power base station and the downlink dedicated control physical channel for transmitting data to the user in the soft handover area, excluding the above physical channels, acquire individual transmission power according to the transmission power of the non-enhanced primary common pilot channel.

Preferably, the method further includes: the obtaining Delta according to a size of an imbalance area of uplink and downlink between a cell in a low-power base station and a macro cell, a soft handover parameter, and an offset parameter of an independent cell in the cell of the low-power base station in the case of the transmission power of the non-enhanced primary common pilot channel.

Preferably, in the case that a soft handover measuring report is triggered at an uplink boundary and the soft handover procedure can succeed, the obtaining the Delta according to the size of the imbalance area of uplink and downlink, the soft handover parameter, and the offset parameter of the independent cell in the cell of the low-power base station is implemented according to:

Delta=DU−(R1a−H1a/2+CIO); wherein Delta is the increment, DU is the size of the imbalance area of uplink and downlink, R1a and H1a are the soft handover parameter, and CIO is the offset parameter.

Preferably, in the case that a downlink pilot boundary can be the same as the uplink boundary, the obtaining the Delta according to the size of the imbalance area of uplink and downlink, the soft handover parameter, and the offset parameter of the independent cell in the cell of the low-power base station is implemented according to:

Delta=DU−CIO; wherein is the increment, DU is the size of the imbalance area of uplink and downlink, and CIO is the offset parameter.

A base station includes:

a first power adjusting unit configured to acquire transmission power of an enhanced primary common pilot channel according to transmission power of a non-enhanced primary common pilot channel and an increment;

a second power adjusting unit configured to set transmission power of a downlink service channel to be the same as the transmission power of the non-enhanced primary common pilot channel, and acquire the transmission power of the downlink service channel according to the transmission power of the non-enhanced primary common pilot channel; and a transmission unit configured to transmit data in the enhanced primary common pilot channel and the downlink service channel by respectively using the transmission power of the enhanced primary common pilot channel and the transmission power of the downlink service channel.

Preferably, the first power adjusting unit is further configured to use the following equation to acquire the transmission power of the enhanced primary common pilot channel according to the transmission power of the non-enhanced primary common pilot channel and the increment: $P_{p\text{-}cpich}=P_{vitrual\_p\_cpich}+\text{Delta}$; wherein $P_{p\text{-}cpich}$ is the transmission power of the enhanced primary common pilot channel, $P_{vitrual\_p\_cpich}$ is the transmission power of the non-enhanced primary common pilot channel, and De is the increment.

Preferably, the second power adjusting unit is further configured to use the following equation to acquire the transmission power of the downlink service channel according to the transmission power of the non-enhanced primary common pilot channel: $P_{HSPDSCH}=P_{vitrual\_p\_cpich}+\Gamma$; wherein $P_{HSPDSCH}$ is the transmission power of the downlink service channel, $P_{virtual\_p\_cpich}$ is the transmission power of the non-enhanced primary common pilot channel, and $\Gamma$ is obtained by a signaling configuration of a base station application part protocol NBAP via a wireless network controller RNC.

Preferably, the first power adjusting unit is further configured to acquire transmission power of a downlink physical channel in a cell of a low-power base station and transmission power of a downlink dedicated control physical channel for transmitting data to a user in a soft handover area according to the transmission power of the enhanced primary common pilot channel;

the downlink physical channel in the cell of the low-power base station, and the downlink dedicated control physical channel for transmitting data to the user in the soft handover area includes any of the following physical channels:

a primary common control physical channel, a primary synchronization channel, a secondary synchronization channel, an enhanced uplink hybrid automatic repeat request indicator channel, a dedicated physical control channel, a fractional dedicated physical channel, and an enhanced uplink relative grant channel; and the second power adjusting unit is further configured to acquire individual transmission power of all the other channels among the downlink physical channel in the cell of the low-power base station and the downlink dedicated control physical channel for transmitting data to the user in the soft handover area, excluding the primary common control physical channel, the primary synchronization channel, the secondary synchronization channel, the enhanced uplink hybrid automatic repeat request indicator channel, the dedicated physical control channel, the fractional dedicated physical channel, and the enhanced uplink relative grant channel, according to the transmission power of the non-enhanced primary common pilot channel.

Preferably, the first power adjusting unit further includes:

an increment acquiring subunit configured to obtain Delta according to a size of an imbalance area of uplink and downlink between a cell of a low-power base station and a macro cell, a soft handover parameter, and an offset parameter of an independent cell in the low-power base station cell in the case of the transmission power of the non-enhanced primary common pilot channel.

Preferably, the increment acquiring subunit is further configured to, in the case that a soft handover measuring report is triggered at an uplink boundary and the soft handover procedure can succeed, Delta=DU−(R1a−H1a/2+CIO); wherein Delta is the increment, DU is the size of the imbalance area of uplink and downlink, R1a and H1a are the soft handover parameter, and CIO is the offset parameter.

Preferably, the increment acquiring subunit is further configured to, in the case that a downlink pilot boundary can be the same as the uplink boundary, Delta=DU−CIO; wherein Delta is the increment, DU is the size of the imbalance area of uplink and downlink, and CIO is the offset parameter.

The first power adjusting unit, the second power adjusting unit, the transmission unit, and the increment acquiring subunit are implemented by using a Central Processing Unit (CPU), a Digital Signal Processor (DSP), or a Field-Programmable Gate Array (FPGA) when performing processing.

The method according to the embodiments of the present disclosure includes: acquiring transmission power of an enhanced primary common pilot channel according to transmission power of a non-enhanced primary common pilot channel and an increment; setting transmission power of a downlink service channel to be the same as the transmission power of the non-enhanced primary common pilot channel, and acquiring the transmission power of the downlink service channel according to the transmission power of the non-enhanced primary common pilot channel; and using the transmission power of the enhanced primary common pilot channel and the transmission power of the downlink service channel to respectively transmit data in the enhanced primary common pilot channel and the downlink service channel.

Since the transmission power of the primary common pilot channel in the cell of the low-power base station is enhanced, an area range between the downlink boundary and the uplink boundary of the primary common pilot in the macro cell and the low-power cell may be narrowed, and by transmitting data in the primary common pilot channel and the downlink service channel by respectively using different transmission power of the primary common pilot channel and the downlink service channel, the spatial separation between the downlink boundary of the primary common pilot and the downlink service boundary can be achieved, and thereby avoiding the interference to the user in the imbalance area in the network deployment.

DETAILED DESCRIPTION

Hereinafter, the implementation of the technical solutions would be further described in detail in combination with the drawings.

In the embodiments of the present disclosure, a UMTS network deployment is used as an example for explanations. In the network deployment of the UMTS Hetnet, the problem of imbalance between an uplink and a downlink of the user results in a series of reductions of the user performance, such as a limitation of uplink coverage of some cells, a reduction of uplink macro diversity gain, even no uplink macro diversity gain, or even a dropped call of the user, a very low uplink and downlink data traffic flow, or a failed handover, and an interference to service experience of the user in the uplink and downlink imbalance area.

The reasons for imbalance of uplink and downlink of the user may have many conditions, for example:

1) The pilot frequency configuration for individual cells in a network planning are different, and the pilot frequency of some cells is configured to be greater than or smaller than the pilot frequency of the adjacent cell;

2) Due to different production batches of base station devices in the network or improvement of receiving sensitivity of a new base station, the receiving sensitivities of adjacent base stations differ greatly;

3) The external interference results in a deterioration of the downlink coverage or the uplink coverage; and 4) In hotspots or blind zones of some users, the service requirements by the hotspots or blind zones are satisfied by adding a low-power base station in a coverage area of a macro cell. Since the power of the low-power base station differs greatly from that of the macro base station, while the receiving sensitivity of the low-power base station is equal to that of the macro base station or there is a relatively small difference between the receiving sensitivity of the low-power base station and that of the macro base station, a relatively big imbalance area of the uplink and downlink would occur at an edge area of the low-power base station.

Figure 1:
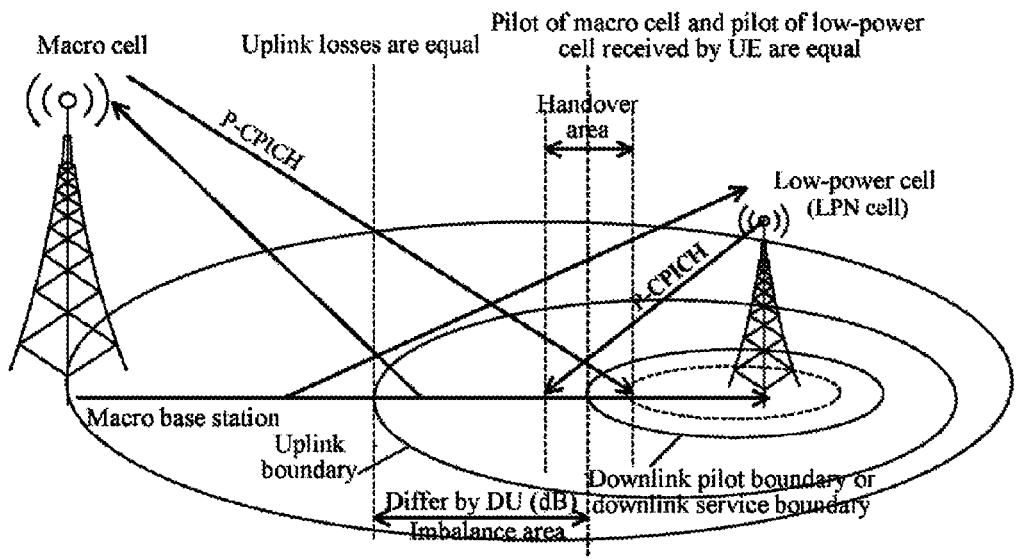
FIG. 1 is a schematic diagram of an imbalance of uplink and downlink in a UMTS Hetnet.

Especially, mobile broadband services develop rapidly, and data services of various 3GPP model smart terminals (such as mobile phones, data cards, and iPad) are applied in an eruptible manner, thereby an eruptible increase of the data traffic in the hotspots and various APP applications based on mobile Internet application is presented. The problems cannot be completely solved by only improving the performance of the conventional macro cell. Therefore, a low-power base station (such as Micro, Pico base station) having the same frequency as that of the macro cell is deployed in the macro cell to satisfy the requirements by the rapidly growing data traffic and APP applications based on the mobile Internet application. Such low-power base station is deployed in the macro cell to complementally cover the hotspot, and forms a Hetnet heterogeneous network in which the macro cell and the low-power cell coexist. In the UMTS Hetnet scene, the imbalance of the uplink and downlink in the UMTS Hetnet network is as shown in FIG. 1.

With respect to the imbalance problem of the uplink and downlink, the embodiments of the present disclosure solve the interference of the user in the UMTS Hetnet by using the technique of enhancing the pilot frequency, so as to solve the reduction problem of the user performance brought out by the imbalance of the uplink and downlink service links.

Figure 2:
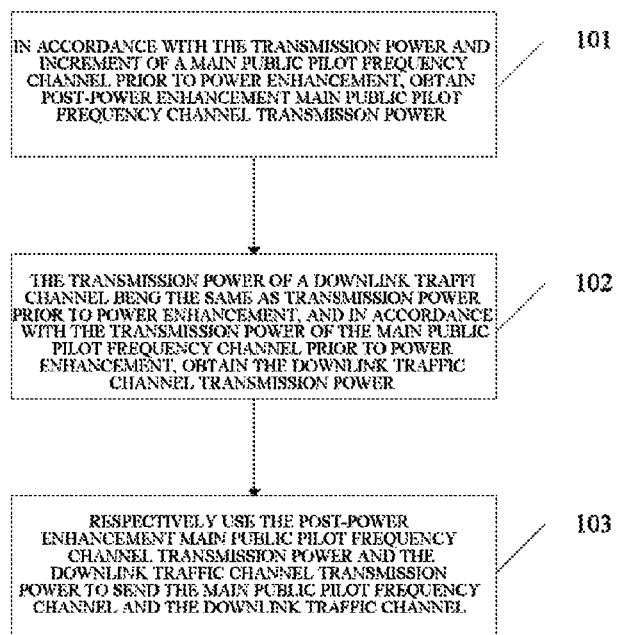
FIG. 2 is a flowchart of a method according to embodiments of the present disclosure.

As shown in FIG. 2, the method for improving the transmission power of the pilot frequency in the imbalance area according to the embodiments of the present disclosure includes the following steps.

In step 101, transmission power of a primary common pilot channel after power enhancement is obtained according to transmission power of the primary common pilot channel without power enhancement and an increment.

Herein, the transmission power of the primary common pilot channel without power enhancement is transmission power of the original primary common pilot channel.

In step 102, the transmission power of a downlink service channel is the same as the transmission power of the primary common pilot channel without power enhancement, and the transmission power of the downlink service channel is obtained according to the transmission power of the primary common pilot channel without power enhancement.

Herein, the transmission power of the primary common pilot channel without power enhancement is the transmission power of the original primary common pilot channel. In step 102, the transmission power of the original primary common pilot channel is used as a reference of the transmission power of the downlink service channel, and thereby coverage of the downlink service channel is the same as that of the original primary common pilot channel.

In step 103, data in the primary common pilot channel and the downlink service channel are transmitted by respectively utilizing the transmission power of the primary common pilot channel after power enhancement and the transmission power of the downlink service channel.

In the step 103, the transmission power of the primary common pilot channel after power enhancement and the transmission power of the downlink service channel are adopted to respectively transmit data in the primary common pilot channel and the downlink service channel, so as to achieve a spatial separation between a downlink boundary of the primary common pilot channel and a boundary of the downlink service.

The steps 101-102 in the present embodiment may be performed in any order.

Figure 3:
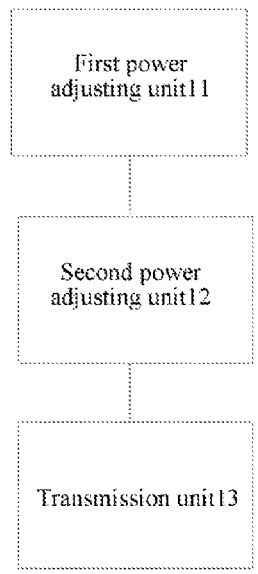
FIG. 3 is a block diagram of a structure according to the embodiments of the present disclosure.

As shown in FIG. 3, the base station according to the embodiments of the present disclosure includes: a first power adjusting unit 11 configured to obtain transmission power of a primary common pilot channel after power enhancement according to transmission power of the primary common pilot channel without power enhancement and an increment; a second power adjusting unit 12 configured to set the transmission power of a downlink service channel to be the same as the transmission power of the primary common pilot channel without power enhancement, and obtain the transmission power of the downlink service channel according to the transmission power of the primary common pilot channel without power enhancement; and a transmission unit 13 configured to transmit data in the primary common pilot channel and the downlink service channel are transmitted by respectively utilizing the transmission power of the primary common pilot channel after power enhancement and the transmission power of the downlink service channel.

It should be noted herein that the first power adjusting unit 11, the second power adjusting unit 12, and the transmission unit 13 are located at the low-power base station side, and when performing processing, they may be implemented by using a Central Processing Unit (CPU), a Digital Signal Processor (DSP), or a Field-Programmable Gate Array (FPGA).

The embodiments of the present disclosure may achieve the following advantageous effects.

The embodiments of the present disclosure provide a solution for solving the imbalance of the uplink and downlink, and the solution is achieved by using a pilot frequency enhancing technology to strengthen the pilot frequency transmission power of the low-power base station, thereby a spatial separation between the downlink boundary of the primary common pilot channel and the boundary of the original downlink service in the low-power cell is achieved, and differentiated coverage between the pilot frequency of the low-power cell and the downlink service is achieved. The pilot frequency and broadcasting channel in the low-power cell have a large coverage, and the downlink service of the low-power cell has a small coverage, which solves the problem that the user in a macro-micro imbalance area cannot realize a soft handover procedure and a wireless interface synchronization procedure successfully. In this way, the user in the imbalance area of the uplink and downlink service links can obtain the uplink macro diversity gain, an uplink interference may be avoided to be applied to the low-power cells by the user in the imbalance area of the uplink and downlink service links, the interference becomes into useful signals, the service experience of the user is improved, and the performance of the Hetnet network is improved. Through the embodiments of the present disclosure, without updating the UMTS terminal in the related art, the problems, such as a failed handover, a failed handover, and a poor data service experience, due to the imbalance of the uplink and downlink service links can be solved fundamentally, and the capacity and performance of the network are improved.

Hereinafter, to facilitate depiction, with respect to the solution for solving the imbalance of the uplink and downlink, the embodiments of the present disclosure would be explained by using the UMTS Hetnet scene for reference. FIG. 1 illustrates a schematic diagram of an imbalance of the uplink and downlink in a conventional UMTS Hetnet, wherein the uplink boundary differs by DU (dB) from the downlink boundary. To facilitate depiction, in the subsequent embodiments, the transmission power of a virtual primary common pilot channel represents the transmission power of the primary common pilot channel without power enhancement (the transmission power of the original primary common pilot channel), which is not elaborated herein.

In a first aspect, a spatial separation between a downlink pilot boundary and a boundary of the downlink service channel is achieved by enhancing the transmission power of the primary common pilot channel P-CPICH and introducing the transmission power of the virtual primary common pilot channel of the low-power base station.

The transmission power of the primary common pilot channel (P-CPICH) of the low-power base station is added by Delta (dB) on the basis of the transmission power of the original primary common pilot channel (P-CPICH), and a magnitude of the added Delta (dB) is determined by a size of an imbalance area of the uplink and downlink between the cell in the original low-power base station and a macro cell, parameters of soft handover R1a, H1a, and a magnitude of an offset CIO parameter of an independent cell in the low-power base station (which would be described particularly in the subsequent second aspect). For convenience of description, the primary common pilot channel after power enhancement is referred to as Enhanced primary common pilot channel (Enhanced P-CPICH), and the original primary common pilot channel (non-enhanced primary common pilot channel) is referred to as Virtual P-CPICH or Old P-CPICH. In addition, in order to ensure a successful wireless interface synchronization during the soft handover procedure, the transmission power of the primary common pilot channel (P-CPICH), the Primary Synchronization Channel (P-SCH), and the Secondary Synchronization Channel (S-SCH) are added by Delta (dB) correspondingly, and are respectively referred to as an Enhanced P-CCPCH, an Enhanced P-SCH, and an Enhanced S-SCH.

Figure 5:
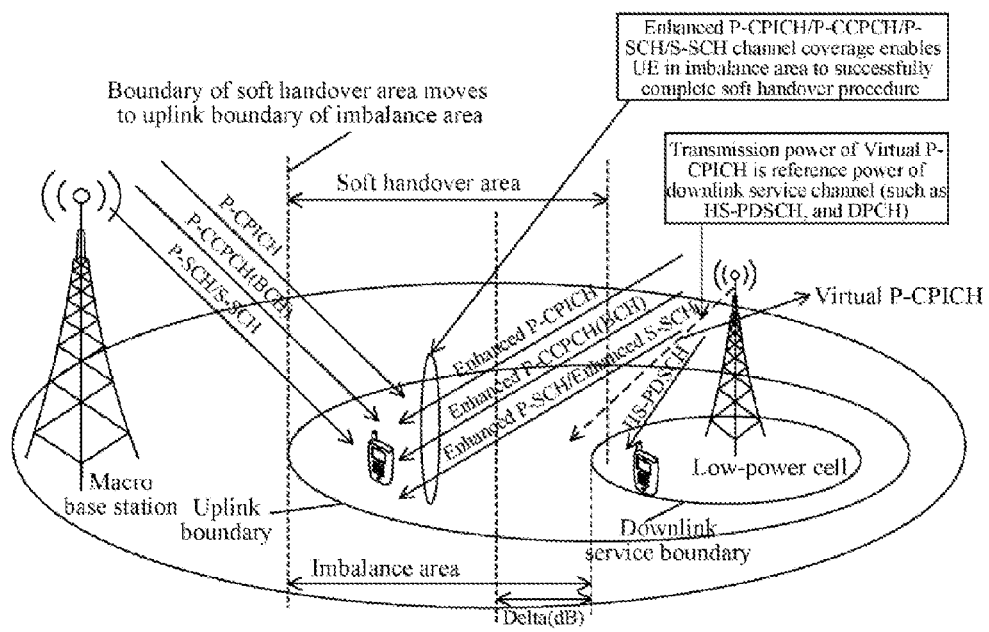
FIG. 5 is a schematic diagram showing that after enhancing the P-CPICH/P-CCPCH/SCH power in the cell of the low-power base station, the boundary of the imbalance area triggers the soft handover via the pilot boundary, according to the embodiments of the present disclosure.
Figure 6:
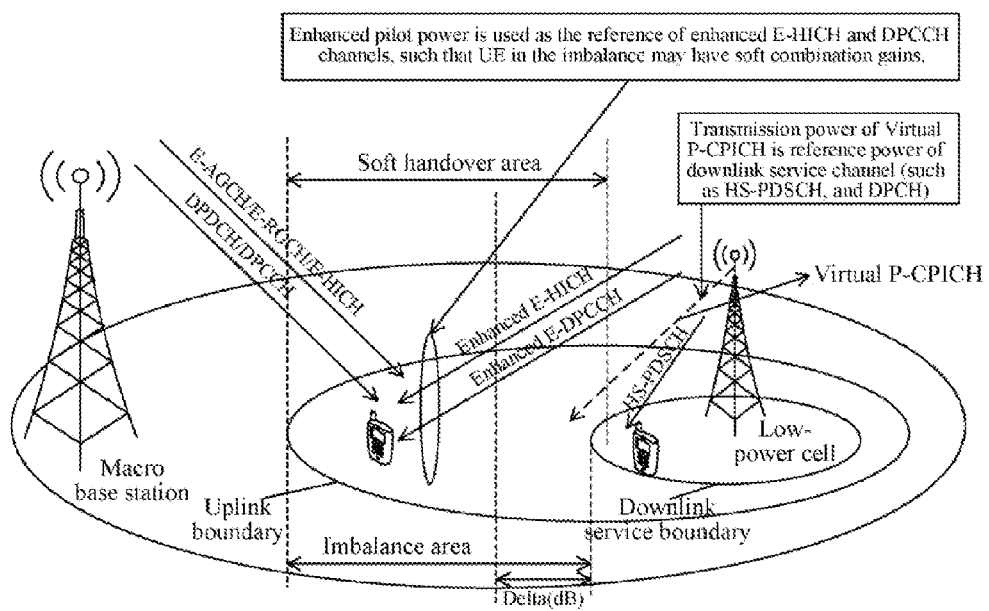
FIG. 6 is a schematic diagram showing that a downlink dedicated channel DPCCH/E-HICH power transmitted for the user in the imbalance area uses the Enhanced P-CPICH power as reference power, according to the embodiments of the present disclosure.

In the cell of the low-power base station, the power of the Enhanced P-CPICH is used as reference power by the transmission power of the downlink common physical channels P-CCPCH, P-SCH, S-SCH and the downlink dedicated control physical channel E-HICH/DPCCH/F-DPCH/E-RGCH for transmitting data to the user in the soft handover area, and other downlink physical channels are all use the transmission power of the virtual primary common pilot channel (Virtual P-CPICH) as the reference power, as shown in FIGS. 5 and 6.

It should be noted herein that the respective transmission power of the above-mentioned downlink physical channels in the cell of the low-power base station and the downlink dedicated control physical channel for transmitting data to the user in the soft handover area are obtained according to the Enhanced P-CPICH transmission power. That is, among the downlink physical channel in the cell of the low-power base station and the downlink dedicated control physical channel for transmitting data to the user in the soft handover area, the channels including P-CCPCH, P-SCH, S-SCH, E-HICH, DPCCH, F-DPCH, and E-RGCH use the transmission power of the Enhanced P-CPICH as the reference power. As to how to obtain individual transmission power of these channels, a proportional relation between the transmission power of these channels and the reference power (the transmission power of the Enhanced P-CPICH) follows an existing power proportion, while the reference power is the transmission power of the Enhanced P-CPICH. Excluding these channels, other channels use the transmission power of the Virtual P-CPICH as the reference power, and as to how the other channels obtain respective transmission power according to the transmission power of the Virtual P-CPICH, a proportional relation between the power of the other channels and the reference power (the transmission power of the Virtual P-CPICH) follows an existing power proportion, while the reference power is the transmission power of the Virtual P-CPICH.

For example, the downlink physical channel HS-PDSCH of the HSDPA service and the R99 downlink dedicated physical data channel DPDCH use the transmission power of the virtual primary common pilot channel as the reference power, such that the coverage of the downlink HSDPA/R99 in the cell of the low-power base station is identical to that of the virtual primary common pilot channel Virtual P-CPICH (smaller than the coverage of the Enhanced P-CPICH). In this way, the coverage of the pilot frequency in the cell of the low-power base station is greater than the coverage of the downlink service in the cell of the low-power base station, thereby the user in the imbalance area obtains the uplink service of the cell in the low-power base station.

By increasing the transmission power of the primary common pilot frequency in the cell of the low-power base station, an area between the downlink boundary and the uplink boundary of the primary common pilot frequency of the macro cell and the low-power cell may reduce, even the boundary of the downlink pilot frequency may be completely identical to the uplink boundary. In this way, the UE in the imbalance area between the original boundaries of the uplink and the downlink can detect a primary common pilot signal in the cell of the low-power base station, thereby there is an opportunity that a soft handover measuring event is triggered to be reported, and the downlink pilot boundary moves towards the uplink boundary by enhancing the pilot transmission power.

Figure 4:
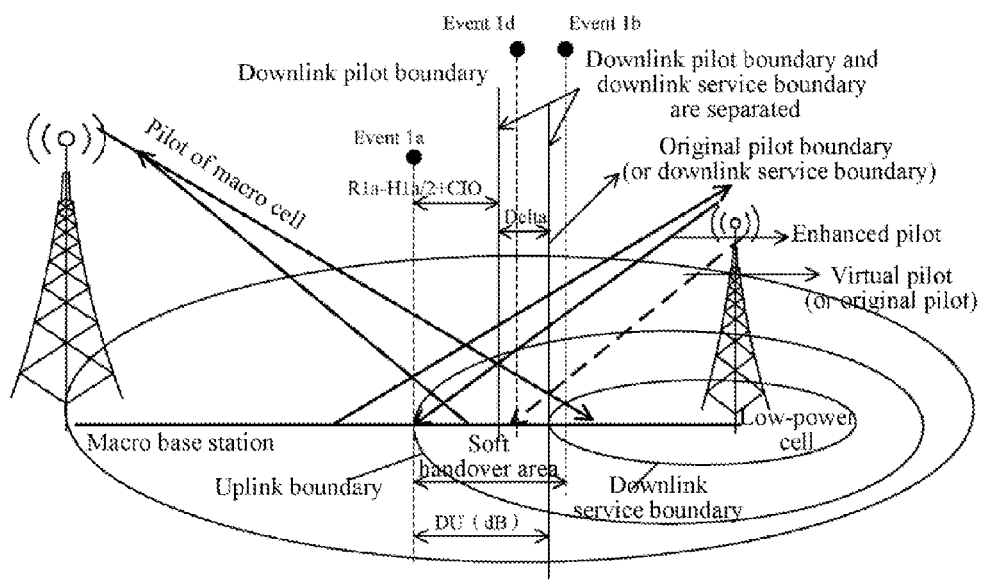
FIG. 4 is a schematic diagram showing that after enhancing the pilot power of a cell in the low-power base station, a soft handover is triggered at a boundary of an imbalance area, and thus the downlink pilot boundary and the downlink service boundary are separated, according to the embodiments of the present disclosure.
Figure 7:
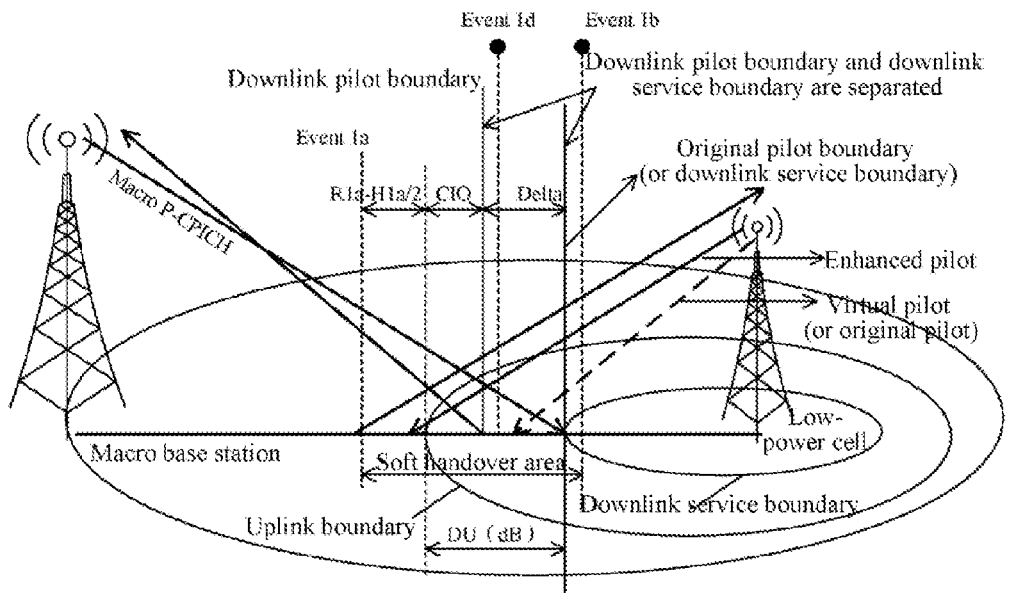
FIG. 7 is a schematic diagram showing that after enhancing the pilot power of the cell in the low-power base station, a soft handover is triggered at an area outside the imbalance area, and thus the downlink pilot boundary and the downlink service boundary are separated, according to the embodiments of the present disclosure.

The transmission power of the downlink service channel is obtained according to the transmission power of the Virtual P-CPICH by using the following equation: $P_{HSPDSCH}=P_{virtual\_p\_cpich}+\Gamma$, wherein $P_{HSPDSCH}$ is the transmission power of the downlink service channel, $P_{virtual\_p\_cpich}$ is the transmission power of the Virtual P-CPICH, and Γ is obtained by a signaling configuration of a base station application part protocol (NBAP) via the wireless network controller (RNC). The transmission power of the Virtual P-CPICH represents the transmission power of the primary common pilot channel without power enhancement (the transmission power of the original primary common pilot channel). That is, the downlink service channel of the low-power base station uses the transmission power of the Virtual P-CPICH as the reference power, and then a spatial separation is achieved between the downlink boundary of the primary common pilot frequency and the original downlink service boundary of the macro cell and the low-power cell, as shown in FIGS. 4 and 7. The pilot power configuration and the configuration manner between the downlink physical channel and the pilot frequency in related art result in that the downlink pilot boundary and the downlink service boundary are the same (refer to FIG. 1).

In a second aspect, there is provided a method for enhancing P-CPICH power in the cell of the low-power base station.

Enabling the user in the imbalance area of uplink and downlink to receive the uplink service from the low-power cell may have the following two possible conditions.

1) In a first condition, a soft handover measuring report should be triggered at the uplink boundary and the soft handover procedure can succeed, then the transmission power of the Enhanced P-CPICH needs to be added by Delta (dB) relative to the transmission power of the Virtual P-CPICH, i.e., $P_{p\text{-}cpich}=P_{virtual\_p\_cpich}+\text{Delta}$, and the transmission power of the primary common control physical channel (P-CCPCH), the primary Synchronization Channel (P-SCH), and the Secondary Synchronization Channel (S-SCH) are added by Delta (dB) accordingly, as shown in FIG. 5. The magnitude of Delta is associated with the soft handover parameters R1a, H1a, and the offset CIO parameter of the independent cell in the low-power base station, and the magnitude of Delta follows the following equation: Delta=DU−(R1a−H1a/2+CIO), as shown in FIG. 4.

In order to obtain the uplink macro diversity gain by the user in the imbalance area, the power of the downlink dedicated channel DPCCH/E-HICH transmitted for the user in the imbalance area uses the power of the Enhanced P-CPICH as the reference power, as shown in FIG. 6.

Figure 8:
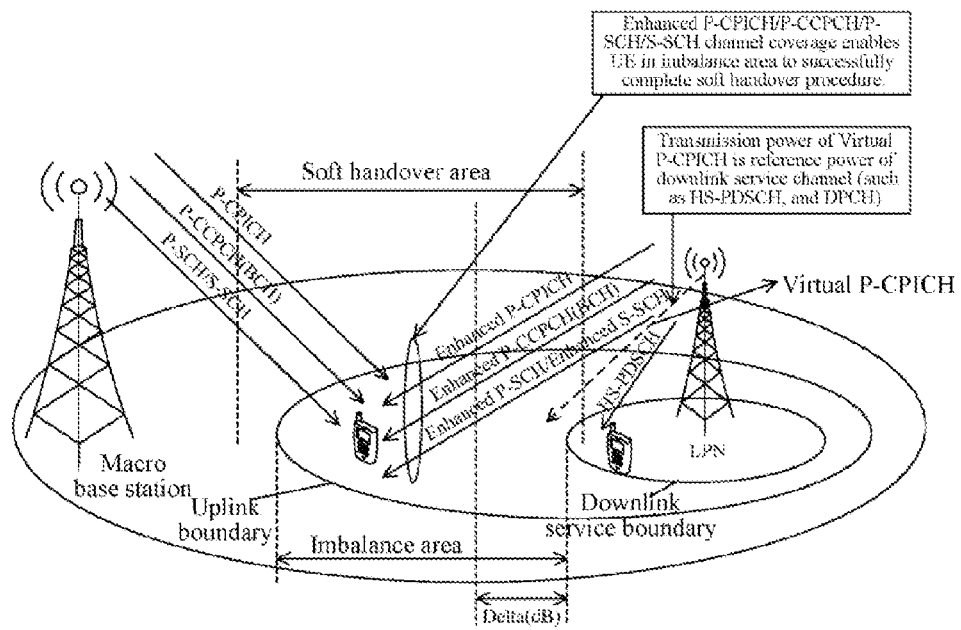
FIG. 8 is a schematic diagram showing that after enhancing the P-CPICH/P-CCPCH/SCH power in cell of the low-power base station, the soft handover is triggered at the area outside the imbalance area via the pilot boundary, according to the embodiments of the present disclosure.

2) In a second condition, the downlink pilot boundary is set to be the same as the uplink boundary. In this way, Delta needs to be set relatively big, thus the uplink soft combination gain area outside the uplink boundary (towards the macro cell) can also receive the uplink service from the low-power cell. The transmission power of the Enhanced P-CPICH needs to be added by Delta (dB) relative to the transmission power of the Virtual P-CPICH, i.e., $P_{p\text{-}cpich}=P_{vitrual\_p\_cpich}+\text{Delta}$, and the transmission power of the primary common control physical channel (P-CCPCH), the primary Synchronization Channel (P-SCH), and the Secondary Synchronization Channel (S-SCH) are added by Delta (dB) accordingly, as shown in FIG. 8. The magnitude of Delta is associated with the offset CIO parameter of the independent cell in the low-power base station, and the magnitude of Delta follows the following equation: Delta=DU−CIO, as shown in FIG. 7.

Figure 9:
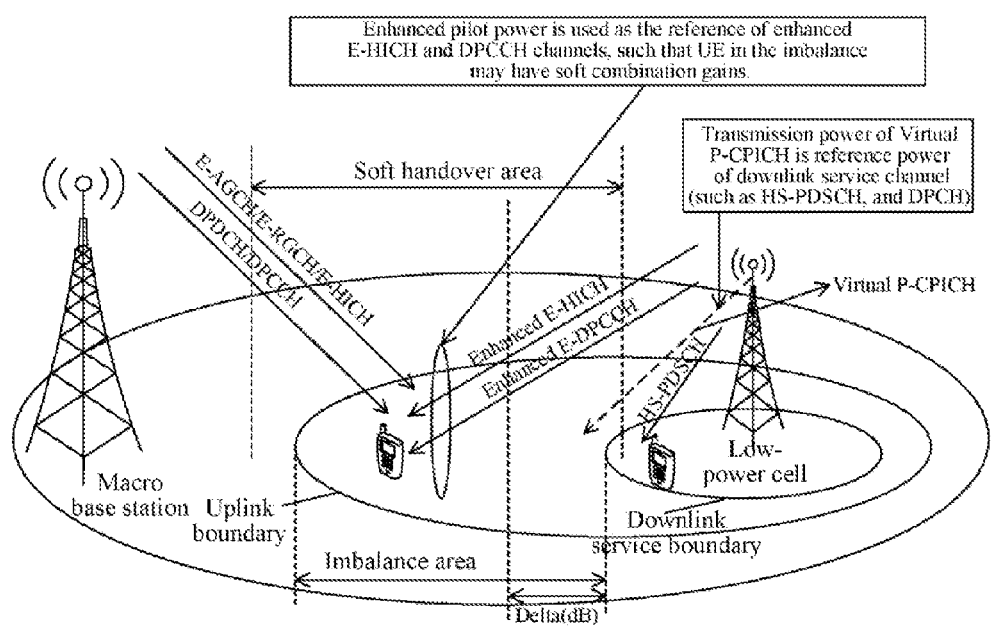
FIG. 9 is a schematic diagram showing that the downlink dedicated channel DPCCH/E-HICH power transmitted for the user in the imbalance area and for the user in the area outside the imbalance area uses the Enhanced P-CPICH power as reference power, according to the embodiments of the present disclosure.

In order to obtain the uplink macro diversity gain by the user in the imbalance area and the user outside the imbalance area, the power of the downlink dedicated channel DPCCH/E-HICH transmitted for the user in the imbalance area and the user outside the imbalance area uses the power of the Enhanced P-CPICH as the reference power, as shown in FIG. 9.

The CIO of the low-power cell may be set to 0, or may be set to non-zero. The greater the CIO is, the smaller the Delta is, and the smaller the added power of the pilot frequency is. In sum, the setting of the CIO parameter and the setting of the downlink pilot power enhancement Delta need to ensure the success of the soft handover procedure, especially the success of the synchronization procedure of the wireless interface. In this way, the uplink macro diversity gain may be brought out.

Hereinafter, explanations to the embodiments of the present disclosure are given by using specific application cases.

First Application Case:

For example, a low-power base station in which maximum transmission power of each cell is 34 dB(2.5 W) is deployed in a macro cell which has the same frequency as that of the low-power base station and has the maximum transmission power 43 dB(20 W), wherein the receiving sensitivities of the low-power cell and the macro cell are the same. In this case, the size of the imbalance area of the uplink and downlink boundaries is DU=43−34=9 dB.

During the movement of a UE from the macro cell to the low-power cell, if it is desired to trigger a soft handover measuring report at the uplink boundary and make the soft handover procedure succeed, the enhancement of the pilot power of the low-power base station refers to the requirements shown in FIG. 4, wherein R1a=3 dB, H1a=0, and the offset of the independent cell in the cells of the low-power base station is set to CIO=3 dB, and thus Delta=DU−(R1a−H1a/2+CIO)=9−(3−0+3)=3 dB.

During the movement of the UE from the macro cell to the low-power cell, if it is desired that the downlink pilot boundary is identical to the uplink boundary, thereby the uplink soft combination gain area outside the uplink boundary (towards the macro cell) can also receive the uplink service from the low-power cell, the enhancement of the pilot power of the low-power base station refers to the requirements shown in FIG. 7, wherein R1a=3 dB, H1a=0, and the offset of the independent cell in the cells of the low-power base station is set to CIO=6 dB, and thus Delta=DU−CIO=9−6=3 dB.

Through the above-mentioned two different CIO configurations, the transmission power of the primary common pilot channel (P-CPICH) is increased by 3 dB on the basis of the transmission power of the original primary common pilot channel (P-CPICH), and accordingly, the transmission power of the primary common control physical channel (P-CCPCH), the primary Synchronization Channel (P-SCH), and the Secondary Synchronization Channel (S-SCH) are increased by 3 dB. According to conventional configuration proportion of output power of the common physical channel in the cell, for example, P-CPICH, P-CCPCH, P-SCH, S-SCH respectively occupy 10%, 5%, 4%, 4% of the maximum transmission power, and totally occupy 23% of the maximum transmission power of the cell. Referring to the following Table 8 (Table 8 is a transmission power configuration table of the downlink channel in the low-power base station without enhancing the primary pilot power), after 3 dB is added, the P-CPICH, P-CCPCH, P-SCH, and S-SCH in the cells of the low-power base station would increase by 23% of the transmission power.

The increased 23% power of the P-CPICH, P-CCPCH, P-SCH, and S-SCH may have the following two configuration manners.

In a first configuration manner, the increased 23% power of the P-CPICH, P-CCPCH, P-SCH, and S-SCH occupies the transmission power of the current cell, that is, the P-CPICH, P-CCPCH, P-SCH, and S-SCH occupy 46% of the maximum transmission power of the cell, which means that the available power of downlink service relevant channels is reduced by 0.575 W(=2.5*23%), as shown in the Table 9 below (Table 9 is the transmission power configuration table in the case that the primary pilot power of the cell in the low-power base station is enhanced, and the maximum transmission of the cell keeps to be constant).

In a second configuration manner, the increased 23% power of the P-CPICH, P-CCPCH, P-SCH, and S-SCH does not occupy the transmission power of the current cell, that is, the maximum transmission power of the cells in the low-power base station is increased by 23%, which means that the available power of the downlink service relevant channels would not reduce due to the enhancement of the pilot power, as shown in the Table 10 below (Table 10 is the transmission power configuration table in the case that the primary pilot power of the cell in the low-power base station is enhanced, and the maximum transmission of the cell is enhanced at the same time). The available power of the downlink service channels of downlink R99&HSDPA&HSUPA does not reduce, and the maximum transmission power 34 dB(2.5 W) of the cells in the original low-power base station is increased to 34.8 dB (2.5×(1+23%)=3 W). In this way, by increasing the transmission power of the pilot frequency and broadcasting channel and the synchronization channel, the user in the original imbalance area can receive the uplink service from the low-power cell, and thus the performance and capacity of the system are improved.

Second Application Case:

For example, a low-power base station in which maximum transmission power of each cell is 31 dB(1.25 W) is deployed in a macro cell which has the same frequency as that of the low-power base station and has the maximum transmission power 43 dB(20 W), wherein the receiving sensitivities of the low-power cell and the macro cell are the same. In this case, the size of the imbalance area of the uplink and downlink boundaries is DU=43−31=12 dB.

During the movement of a UE from the macro cell to the low-power cell, if it is desired to trigger a soft handover measuring report at the uplink boundary and make the soft handover procedure succeed, the enhancement of the pilot power of the low-power base station refers to the requirements shown in FIG. 2, wherein R1a=3 dB, H1a=0, and the offset of the independent cell in the cells of the low-power base station is set to be CIO=SdB, and thus Delta=DU−(R1a−H1a/2+CIO)=12−(3−0+5)=4 dB.

In this way, the transmission power of the primary common pilot channel (P-CPICH) of the low-power base station is increased by 4 dB on the basis of the transmission power of the original common pilot channel (P-CPICH), and accordingly, the transmission power of the primary common control physical channel (P-CCPCH), the primary Synchronization Channel (P-SCH), and the Secondary Synchronization Channel (S-SCH) are increased by 4 dB. According to conventional configuration proportion of output power of the common physical channels in the cell, for example, P-CPICH, P-CCPCH, P-SCH, S-SCH respectively occupy 10%, 5%, 4%, 4% of the maximum transmission power, and totally occupy 23% of the maximum transmission power of the cell. Referring to the following Table 8 (Table 8 is a transmission power configuration table of the downlink channel of the low-power base station without enhancing the primary pilot power), after 4 dB is added, the P-CPICH, P-CCPCH, P-SCH, and S-SCH of the cells of the low-power base station would increase by (2.5−1)×23%=34.5% of the transmission power.

The increased 34.5% power of the P-CPICH, P-CCPCH, P-SCH, and S-SCH may have the following two configuration manners.

In a first configuration manner, the increased 34.5% power of the P-CPICH, P-CCPCH, P-SCH, and S-SCH occupies the transmission power of the current cell, that is, the P-CPICH, P-CCPCH, P-SCH, and S-SCH occupy 46% of the maximum transmission power of the cell, which means that the available power of relevant channels of the downlink service is reduced by 0.43 W(=1.25*34.5%), as shown in the Table 9 below (Table 9 is the transmission power configuration table in the case that the primary pilot power of the cell in the low-power base station is enhanced, and the maximum transmission of the cell keeps to be constant).

In a second configuration manner, the increased 23% power of the P-CPICH, P-CCPCH, P-SCH, and S-SCH does not occupy the transmission power of the current cell, that is, the maximum transmission power of the cells in the low-power base station is increased by 34.5%, which means that the available power of relevant channels of the downlink service would not reduce due to the enhancement of the pilot power, as shown in the Table 10 below (Table 10 is the transmission power configuration table in the case that the primary pilot power of the cell in the low-power base station is enhanced, and the maximum transmission of the cell is enhanced at the same time). The available power of the downlink service channels of downlink R99&HSDPA&HSUPA does not reduce, and the maximum transmission power 31 dB(1.25 W) of the cells in the original low-power base station is increased to 32.3 dB (1.25×(1+34.5%)=1.68 W). In this way, by increasing the transmission power of the pilot frequency and broadcasting channel and the synchronization channel, the user in the original imbalance area can receive the uplink service from the low-power cell, and thus the performance and capacity of the system are improved.

TABLE 8

| | Downlink Physical Channel | Transmission Power | Remarks |
|---|---|---|---|
| Maximum transmission power of low-power base station without primary pilot power enhancement = Tx(W) | P-CPICH | a % * Tx | A % + b % + c % + d % + e % + f % + g % + h % = 1; For example, a % = 10%, b % = 5%, c % = 4%, d % = 4%, P-CPICH/P-CCPCH/P-SCH/S-SC occupy 23% of the total power |
| | P-CCPCH | b % * Tx | |
| | P-SCH | c % * Tx | |
| | S-SCH | d % * Tx | |
| | S-CCPCH | e % * Tx | |
| | AICH | f % * Tx | |
| | PICH | g % * Tx | |
| | DPDCH DPCCH F-DPCH HS-PDSCH HS-SCCH E-AGCH E-RGCH E-HICH | h % * Tx | |

TABLE 9

| | Downlink Physical Channel | Transmission Power | Remarks |
|---|---|---|---|
| Maximum transmission power of low-power base station with primary pilot power enhancement = Tx(W) | P-CPICH | a % * Tx * X | X = 10^(Delta/10); Delta is the added power (dB) for primary pilot frequency of the low-power base station; Example 1: a % = 10%, b % = 5%, c % = 4%, d % = 4%, Delta = 3 dB, X = 2, P-CPICH/P-CCPCH/P-SCH/S-SCH occupy 46% of the total power. Example 2: a % = 10%, b % = 5%, c % = 4%, d % = 4%, Delta = 4 dB, X = 2.5, P-CPICH/P-CCPCH/P-SCH/S-SCH occupy 57.5% of the total power. |
| | P-CCPCH | b % * Tx * X | |
| | P-SCH | c % * Tx * X | |
| | S-SCH | d % * Tx * X | |
| | S-CCPCH | e % * Tx | Deviations between the transmission power and the pilot frequency of the original P-CPICH (the magnitude of the virtual pilot frequency power is a % * Tx) are the same. |
| | AICH | f % * Tx | |
| | PICH | g % * Tx | |
| | DPDCH DPCCH F-DPCH HS-PDSCH HS-SCCH E-AGCH E-RGCH E-HICH | [h % − (a % + b % + c % + d %)(X − 1)] * Tx | Available power of the downlink service channel is reduced by (a % + b % + c % + d %)(X − 1) * Tx, Example 1: Tx = 2.5 W, a % = 10%, b % = 5%, c % = 4%, d % = 4%, Delta = 3 dB, X = 2, the available power of the downlink service channel is reduced by 0.575 W(=2.5 * 23%); Example 2: Tx = 1.25 W, a % = 10%, b % = 5%, c % = 4%, d % = 4%, Delta = 4 dB, X = 2.5, the available power of the downlink service channel is reduced by 0.43 W(=1.25 * 34.5%); |

TABLE 10

| | Downlink Physical Channel | Transmission Power | Remarks |
|---|---|---|---|
| Maximum transmission power of low-power base | P-CPICH | a % * Tx * X | X = 10^(Delta/10); |
| | P-CCPCH | b % * Tx * X | Delta is the added power (dB) for |
| | P-SCH | c % * Tx * X | primary pilot frequency of the |

TABLE 10-continued

| | Downlink Physical Channel | Transmission Power | Remarks |
|---|---|---|---|
| station with primary pilot power enhancement = Tx * (1 + a % + b % + c % + d %)(W) | S-SCH | d % * Tx * X | low-power base station; Example 1: Tx = 2.5 W, a % = 10%, b % = 5%, c % = 4%, d % = 4%, Delta = 3 dB, X = 2, the maximum power of one cell is increased by 2.5 W * 23% = 0.575 W, that is, the maximum transmission power becomes 3 W. Example 2: Tx = 1.25 W, a % = 10%, b % = 5%, c % = 4%, d % = 4%, Delta = 4 dB, X = 2.5, the maximum power of one cell is increased by 1.25 W * 34.5% = 0.43 W, that is, the maximum transmission power becomes 1.68 W. |
| | S-CCPCH | e % * Tx | Deviations between the transmission power and the original P-CPICH power are the same. |
| | AICH | f % * Tx | |
| | PICH | g % * Tx | |
| | DPDCH | h % * Tx | |
| | DPCCH | | The DPCCH power for user in the soft handover area needs to be enhanced. |
| | F-DPCH | | The F-DPCH power for user in the soft handover area needs to be enhanced. |
| | HS-PDSCH | | |
| | HS-SCCH | | |
| | E-AGCH | | |
| | E-RGCH | | The E-RGCH power for user in the soft handover area needs to be enhanced. |
| | E-HICH | | The E-HICH power for user in the soft handover area needs to be enhanced. |

Herein, the English full names and Chinese annotations of the relevant channels involved by the present specification and drawings are explained as follows.

P-CCPCH: Primary Common Control Physical Channel
P-SCH: Primary Synchronization Channel
S-SCH: Secondary Synchronization Channel
AICH: Acquisition Indicator Channel
PICH: Page Indicator Channel
HS-DSCH: High Speed Downlink Shared Channel
DPCCH: Dedicated Physical Control Channel
DPDCH: Dedicated Physical Data Channel
F-DPCH: Fractional Dedicated Physical Channel
E-DCH: Enhanced Dedicated Channel
E-DPCCH: E-DCH Dedicated Physical Control Channel
E-DPDCH: E-DCH Dedicated Physical Data Channel
E-HICH: E-DCH Hybrid ARQ Indicator Channel
E-RGCH: E-DCH Relative Grant Channel
E-AGCH: E-DCH Absolute Grant Channel
HS-DPCCH: Dedicated Physical Control Channel (uplink) for HS-DSCH
HS-PDSCH: High Speed Physical Downlink Shared Channel
HS-SCCH: Shared Control Channel for HS-DSCH The integrated modules in the embodiments of the present disclosure, if being implemented in a software functional module and being sold or used as an independent product, may also be stored in a computer-readable storage medium. Based on such apprehension, the technical solutions according to the embodiments of the present disclosure in essence or a portion in the technical solutions according to the embodiments of the present disclosure contributing for the prior art may be embodied in a software product form. Such computer software product is stored in a storage medium, and includes several instructions for making a computer device (which may be a personal computer, a server, or a network device) execute all or a part of the method according to respective embodiments of the present disclosure.

And the above storage medium includes any mediums capable of storing program codes, such as a U disk, a mobile hard disk, a Read-Only Memory (ROM), a Random Access Memory (RAM), a disk, or an optical disk. In this way, the embodiments of the present disclosure do not limited to any specific combinations of the hardware and the software.

Accordingly, the embodiments of the present disclosure also provide a computer storage medium stored with computer program, and the computer program is configured to perform the method according to the embodiments of the present disclosure.

The above contents are preferred embodiments of the present embodiments, and do not tend to limit the protection scope of the present disclosure.

INDUSTRIAL APPLICABILITY

The method according to the embodiments of the present disclosure includes: acquiring transmission power of an enhanced primary common pilot channel according to transmission power of a non-enhanced primary common pilot channel and an increment; setting transmission power of a downlink service channel to be the same as the transmission power of the non-enhanced primary common pilot channel, and acquiring the transmission power of the downlink service channel according to the transmission power of the non-enhanced primary common pilot channel; and using the transmission power of the enhanced primary common pilot channel and the transmission power of the downlink service channel to respectively transmit data in the enhanced primary common pilot channel and the downlink service channel Since the transmission power of the primary common pilot channel in the low-power base station cell is enhanced, an area range between the downlink boundary and the uplink boundary of the primary common pilot in the macro cell and the low-power cell may be narrowed, and by transmitting data in the primary common pilot channel and the downlink service channel by respectively using different transmission power of the primary common pilot channel and the downlink service channel, the spatial separation between the downlink boundary of the primary common pilot and the downlink service boundary can be achieved, and thereby avoiding the interference to the user in the imbalance area in the network deployment.

What is claimed is:

1. A method for improving transmission power of a pilot frequency in an imbalance area, comprising:

acquiring transmission power of an enhanced primary common pilot channel according to transmission power of a non-enhanced primary common pilot channel and an increment; wherein the acquiring the transmission power of the enhanced primary common pilot channel according to the transmission power of the non-enhanced primary common pilot channel and the increment is implemented according to:

Pp-cpich=Pvitrual_p_cpich+Delta; wherein Pp-cpich is the transmission power of the enhanced primary common pilot channel, Pvitrual_p_cpich is the transmission power of the non-enhanced primary common pilot channel, and Delta is the increment;

setting transmission power of a downlink service channel to be the same as the transmission power of the non-enhanced primary common pilot channel, and acquiring the transmission power of the downlink service channel according to the transmission power of the non-enhanced primary common pilot channel; and using the transmission power of the enhanced primary common pilot channel and the transmission power of the downlink service channel to transmit data in the enhanced primary common pilot channel and the downlink service channel, respectively.

2. The method of claim 1, wherein the acquiring the transmission power of the downlink service channel according to the transmission power of the non-enhanced primary common pilot channel is implemented according to:

$P_{HSPDSCH}=P_{vitrual\_p\_cpich}+\Gamma$; wherein $P_{HSPDSCH}$ is the transmission power of the downlink service channel, $P_{vitrual\_p\_cpich}$ is the transmission power of the non-enhanced primary common pilot channel, and $\Gamma$ is obtained by a signaling configuration of a base station application part protocol NBAP via a wireless network controller RNC.

3. The method of claim 1, further comprising:

acquiring transmission power of a downlink physical channel in a cell of a low-power base station and transmission power of a downlink dedicated control physical channel for transmitting data to a user in a soft handover area according to the transmission power of the enhanced primary common pilot channel;

wherein the downlink physical channel in the cell of the low-power base station, and the downlink dedicated control physical channel for transmitting data to the user in the soft handover area comprises at least one of the following physical channels:

a primary common control physical channel, a primary synchronization channel, a secondary synchronization channel, an enhanced uplink hybrid automatic repeat request indicator channel, a dedicated physical control channel, a fractional dedicated physical channel, and an enhanced uplink relative grant channel; and all the other channels, excluding the above physical channels, among the downlink physical channel in the cell of the low-power base station and the downlink dedicated control physical channel for transmitting data to the user in the soft handover area acquire individual transmission power according to the transmission power of the non-enhanced primary common pilot channel.

4. The method of claim 2, further comprising: obtaining the Delta according to a size of an imbalance area of uplink and downlink between a cell of a low-power base station and a macro cell, a soft handover parameter, and an offset parameter of an independent cell in the cell of the low-power base station in the case of the transmission power of the non-enhanced primary common pilot channel.

5. The method of claim 4, wherein when a soft handover measuring report is triggered at an uplink boundary and a soft handover procedure succeeds, the obtaining the Delta according to the size of the imbalance area of uplink and downlink, the soft handover parameter, and the offset parameter of the independent cell in the cell of the low-power base station is implemented according to:

Delta=DU−(R1a−H1a/2+CIO); wherein Delta is the increment, DU is the size of the imbalance area of uplink and downlink, R1a and H1a are the soft handover parameter, and CIO is the offset parameter.

6. The method of claim 4, wherein when a downlink pilot boundary is the same as the uplink boundary, the obtaining Delta according to the size of the imbalance area of uplink and downlink, the soft handover parameter, and the offset parameter of the independent cell in the cell of the low-power base station is implemented according to:

Delta=DU−CIO; wherein Delta is the increment, DU is the size of the imbalance area of uplink and downlink, and CIO is the offset parameter.

7. A base station, comprising:

a first power adjusting unit configured to acquire transmission power of an enhanced primary common pilot channel according to transmission power of a non-enhanced primary common pilot channel and an increment; wherein the acquiring the transmission power of the enhanced primary common pilot channel according to the transmission power of the non-enhanced primary common pilot channel and the increment is implemented according to:

Pp-cpich=Pvitrual_p_cpich+Delta; wherein Pp-cpich is the transmission power of the enhanced primary common pilot channel, Pvitrual_p_cpich is the transmission power of the non-enhanced primary common pilot channel, and Delta is the increment;

a second power adjusting unit configured to set transmission power of a downlink service channel to be the same as the transmission power of the non-enhanced primary common pilot channel, and acquire the transmission power of the downlink service channel according to the transmission power of the non-enhanced primary common pilot channel; and a transmission unit configured to transmit data in the enhanced primary common pilot channel and the downlink service channel by respectively using the transmission power of the enhanced primary common pilot channel and the transmission power of the downlink service channel.

8. The base station of claim 7, wherein the second power adjusting unit is further configured to use the following equation to acquire the transmission power of the downlink service channel according to the transmission power of the non-enhanced primary common pilot channel:

$P_{HSPDSCH}=P_{vitrual\_p\_cpich}+\Gamma$; wherein $P_{HSPDSCH}$ is the transmission power of the downlink service channel, $P_{vitrual\_p\_cpich}$ is the transmission power of the non-enhanced primary common pilot channel, and $\Gamma$ is obtained by a signaling configuration of a base station application part protocol NBAP via a wireless network controller RNC.

9. The base station of claim 7, wherein the first power adjusting unit is further configured to acquire transmission power of a downlink physical channel in a cell of a low-power base station and transmission power of a downlink dedicated control physical channel for transmitting data to a user in a soft handover area according to the transmission power of the enhanced primary common pilot channel;

the downlink physical channel in the cell of the low-power base station, and the downlink dedicated control physical channel for transmitting data to the user in the soft handover area comprises at least one of the following physical channels:

a primary common control physical channel, a primary synchronization channel, a secondary synchronization channel, an enhanced uplink hybrid automatic repeat request indicator channel, a dedicated physical control channel, a fractional dedicated physical channel, and an enhanced uplink relative grant channel; and the second power adjusting unit is further configured to acquire individual transmission power of all the other channels, excluding the primary common control physical channel, the primary synchronization channel, the secondary synchronization channel, the enhanced uplink hybrid automatic repeat request indicator channel, the dedicated physical control channel, the fractional dedicated physical channel, and the enhanced uplink relative grant channel, among the downlink physical channel in the cell of the low-power base station and the downlink dedicated control physical channel for transmitting data to the user in the soft handover area, according to the transmission power of the non-enhanced primary common pilot channel.

10. The base station of claim 9, the first power adjusting unit further comprises:

an increment acquiring subunit configured to obtain the Delta according to a size of an imbalance area of uplink and downlink between a cell of a low-power base station and a macro cell, a soft handover parameter, and an offset parameter of an independent cell in the cell of the low-power base station in the case of the transmission power of the non-enhanced primary common pilot channel.

11. The base station of claim 10, wherein the increment acquiring subunit is further configured to, when a soft handover measuring report is triggered at an uplink boundary and a soft handover procedure succeeds, obtain the Delta according to Delta=DU−(R1a−H1a/2+CIO); wherein Delta is the increment, DU is the size of the imbalance area of uplink and downlink, R1a and H1a are the soft handover parameter, and CIO is the offset parameter.

12. The base station of claim 10, wherein the increment acquiring subunit is further configured to, when a downlink pilot boundary is the same as the uplink boundary, obtain the Delta according to Delta=DU−CIO; wherein Delta is the increment, DU is the size of the imbalance area of uplink and downlink, and CIO is the offset parameter.

13. The method of claim 1, wherein the acquiring the transmission power of the downlink service channel according to the transmission power of the non-enhanced primary common pilot channel is implemented according to:

$P_{HSPDSCH}=P_{vitrual\_p\_cpich}+\Gamma$; wherein $P_{HSPDSCH}$ is the transmission power of the downlink service channel, $P_{vitrual\_p\_cpich}$ is the transmission power of the non-enhanced primary common pilot channel, and $\Gamma$ is obtained by a signaling configuration of a base station application part protocol NBAP via a wireless network controller RNC.

14. The base station of claim 7, wherein the second power adjusting unit is further configured to use the following equation to acquire the transmission power of the downlink service channel according to the transmission power of the non-enhanced primary common pilot channel:

$P_{HSPDSCH}=P_{vitrual\_p\_cpich}+\Gamma$; wherein $P_{HSPDSCH}$ is the transmission power of the downlink service channel, $P_{vitrual\_p\_cpich}$ is the transmission power of the non-enhanced primary common pilot channel, and $\Gamma$ is obtained by a signaling configuration of a base station application part protocol NBAP via a wireless network controller RNC.

15. A non-transitory computer-readable storage medium storing instructions which, when executed by a processor, cause the processor to perform a method comprising:

acquiring transmission power of an enhanced primary common pilot channel according to transmission power of a non-enhanced primary common pilot channel and an increment; wherein the acquiring the transmission power of the enhanced primary common pilot channel according to the transmission power of the non-enhanced primary common pilot channel and the increment is implemented according to:

Pp-cpich=Pvitrual_p_cpich+Delta; wherein Pp-cpich is the transmission power of the enhanced primary common pilot channel, Pvitrual_p_cpich is the transmission power of the non-enhanced primary common pilot channel, and Delta is the increment;

setting transmission power of a downlink service channel to be the same as the transmission power of the non-enhanced primary common pilot channel, and acquiring the transmission power of the downlink service channel according to the transmission power of the non-enhanced primary common pilot channel; and using the transmission power of the enhanced primary common pilot channel and the transmission power of the downlink service channel to transmit data in the enhanced primary common pilot channel and the downlink service channel, respectively.

* * * * *